United States Patent [19]

Morisawa

[11] Patent Number: 4,577,946
[45] Date of Patent: Mar. 25, 1986

[54] ELECTROMAGNETIC RELEASE DEVICE FOR SINGLE-LENS REFLEX CAMERA

[75] Inventor: Tahei Morisawa, Tokyo, Japan

[73] Assignee: Asahi Kogaku Kogyo K.K., Tokyo, Japan

[21] Appl. No.: 596,750

[22] Filed: Apr. 4, 1984

[30] Foreign Application Priority Data

Apr. 6, 1983 [JP] Japan .............................. 58-50245[U]

[51] Int. Cl.$^4$ .............................................. G03B 19/12
[52] U.S. Cl. .................................................... 354/152
[58] Field of Search ......................... 354/152, 153, 156

[56] References Cited

U.S. PATENT DOCUMENTS 4,429,972  2/1984  Yamamichi et al. ............ 354/152 X
4,502,769  3/1985  Nakamori et al. ................... 354/152

Primary Examiner—William B. Perkey
Attorney, Agent, or Firm—Sughrue, Mion, Zinn, Macpeak and Seas

[57] ABSTRACT

An electromagnetic release device for a single-lens reflex camera which maintains an armature engaged with an electromagnet used to effect shutter release for a maximum period of time to prevent accumulation of dust between the armature and the pole face of the electromagnet. An energizing spring urges an armature lever towards the electromagnet. An armature disengaging spring connected between the armature lever and a mirror driving lever urges the armature lever away from the electromagnet. The armature disengaging spring is positioned and has a spring constant such that a tensile force provided thereby for moving the armature lever away from the electromagnet when the mirror driving lever reaches an upper position thereof is smaller than the force of energizing spring urging the armature lever towards the electromagnet.

5 Claims, 5 Drawing Figures

FIG. 3 FIG. 4
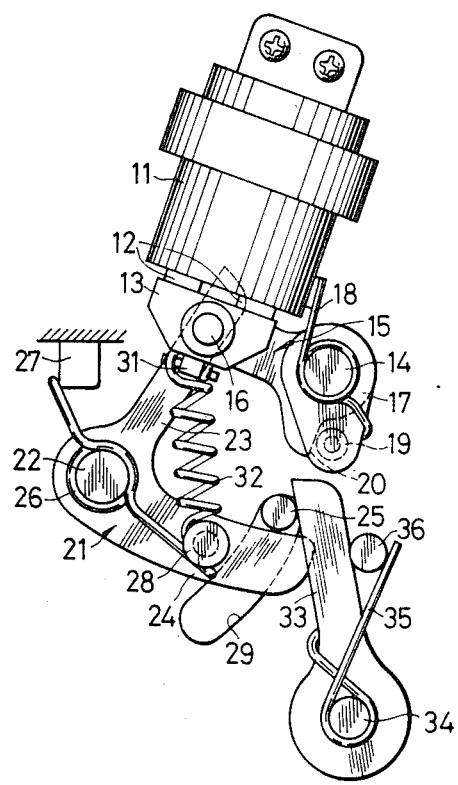
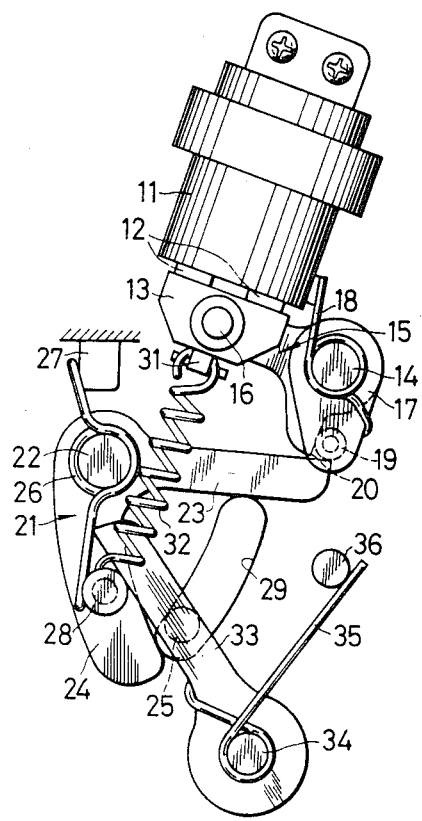
FIG. 5
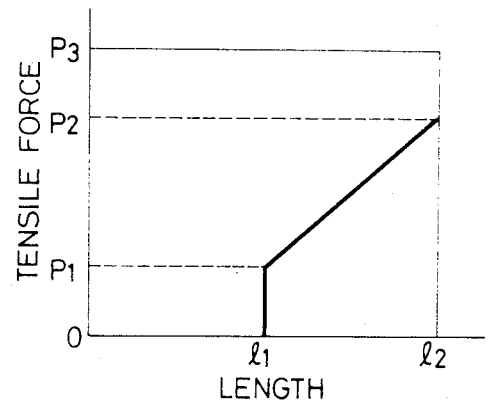

ELECTROMAGNETIC RELEASE DEVICE FOR SINGLE-LENS REFLEX CAMERA

BACKGROUND OF THE INVENTION

The present invention relates to an electromagnetic release device for a single-lens reflex camera in which current is applied to an electromagnet to lift a mirror.

In general, in a conventional electromagnetic release device of this type, in response to a shutter release signal, current is applied to an electromagnet to release an armature, to turn an armature lever, and thereby unlock a mirror driving lever. As a result, the mirror driving lever is turned by an elastic force to lift the mirror. When the mirror has been lifted, the shutter top curtain is run to start exposure. The armature is reset (attracted by the electromagnet) again when a mirror charge member is operated in the next winding operation or when the mirror is restored after the exposure.

In the conventional device, the armature is maintained separated from the core of the electromagnet until the next winding operation, or in the case where the time of exposure is long, the armature is apart from the core for that time. Accordingly, in this operation, dust such as iron powder is liable to adhere to the attraction surfaces of the electromagnet and the armature. If foreign matter such as dust sticks to the attraction surfaces, then the electromagnet cannot satisfactorily attract the armature, which is one cause of shutter failure.

SUMMARY OF THE INVENTION

An object of the invention is thus to provide an electromagnetic release device for a single-lens reflex camera in which the above-described difficulties accompanying a conventional electromagnetic release device have been eliminated. More specifically, an object of the invention is to provide an electromagnetic release device in which, when the mirror has been lifted in response to the shutter release signal, the armature is automatically again attracted by the electromagnet.

A specific feature of the electromagnetic release device of the invention is that an armature lever is urged by an energizing spring so that an armature is moved towards an electromagnet, an armature disengaging spring is laid under tension between the armature lever and a mirror driving lever to urge the armature lever away from the electromagnet, and the relationship between the spring of the armature disengaing spring and the energizing spring is established so that the tensile force of the armature disengaging spring which moves the armature lever away from the eletromagnet when the mirror driving lever reaches its uppermost position is smaller than the force of the energizing spring which moves the armature lever towards the electromagnet.

BRIEF DESCRIPTION OF THE DRAWINGS

FIGS. 1 through 4 are side views showing different operating states of an example of an electromagnetic release device according to the invention; and FIG. 5 is a graphical representation indicating variations of the tensile force of an armature disengaging spring in the device of the invention.

DESCRIPTION OF THE PREFERRED EMBODIMENTS

Figure 1:
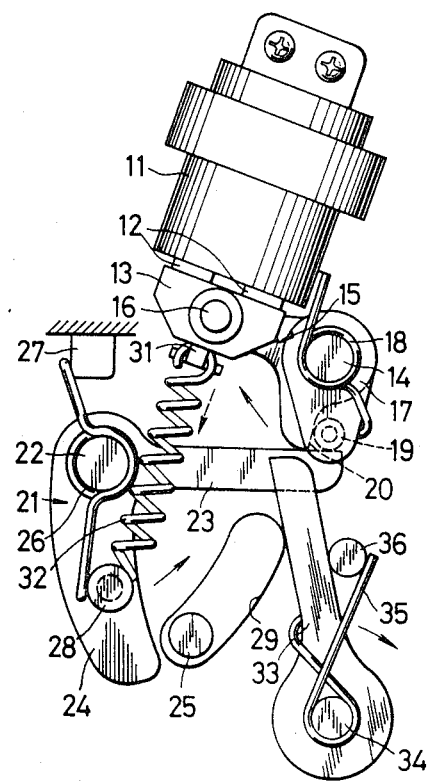

The invention will be described with reference to preferred embodiments shown in the accompanying drawings.

In FIGS. 1 through 4, reference numeral 11 designates an electromagnet having an attracting core, and 13 an armature attracted by the core 12. The armature is secured through a shaft 16 to an armature lever 15 which is rotatably supported by a shaft 14. The electromagnet attracts the armature 13 when energized and releases the armature 13 when deenergized. A locking lever 17 is pivotally mounted on the shaft 14 coaxial with the armature lever 15. The locking lever 17 is urged clockwise (in the figures) by an energizing spring 18. The locking lever 17 has an interlocking pin 19. The interlocking pin 19 abuts against the locking surface 20 of the armature lever 15 to indirectly turn the armature lever clockwise, that is, in the direction in which the armature lever 13 is moved so as to be attracted by the electromagnet 11.

A mirror driving lever 21, rotatably mounted on a shaft 22, has a locking arm 23. The locking arm 23 normally abuts against the interlocking pin 19 of the locking lever 17 to prevent the operating arm 24 of the mirror driving lever 21 from being brought into contact with a mirror operating pin 25. The ends of a mirror lifting spring 26 are respectively supported by a stationary part 27 of the camera body and a spring-hooking pin 28 affixed to the operating arm 24 so that the mirror driving lever 21 is urged counterclockwise. The mirror operating pin 25 is movable along an arcuate groove 29 in the mirror box. The mirror (not shown) is lifted by moving the mirror operating pin 25 upwardly in FIG. 1.

An extension coil spring, namely, an armature disengaging spring 32, is connected between a hook 31 on the armature lever 15 and the spring-hooking pin 28 of the armature lever 15 apart from the electromagnet 11.

In accordance with an important feature of the invention, the tensile force of the spring 32 changes as indicated in FIG. 5. Under the condition that the electromagnet 11 attracts the armature 13 so that the locking arm 23 of the mirror driving lever 21 abuts against the interlocking pin 19 as shown in FIG. 1, the spring 32 has a length $l_2$ and a tensile force $P_2$. The tensile force $P_2$ is smaller than the force of attraction $P_3$ of the electromagnet 11. Accordingly, the armature 13 is maintained attracted by the electromagnet 11 as shown in FIG. 1. When, on the other hand, the mirror driving lever 21 reaches its uppermost position as shown in FIG. 3, the length of the armature disengaging spring 32 is equal to or smaller than its initial length $l_1$ and its tensile force is $P_1$ or smaller. The tensile force is smaller than the elastic force of the energizing spring 18 urging the armature lever 15 towards the electromagnet 15. In other words, the length, strength and initial length of the armature disengaging spring 32 and the positions of the hook 31 and the spring-hooking pin 28 are determined so that the above-described force relationships are established.

After the mirror driving lever 21 has been operated as shown in FIG. 3, a charge lever 33 engages with the spring-hooking pin 28 to turn the mirror driving lever 21 clockwise to its initial position. After being turned counterclockwise about a shaft 34 by a moter or a spring, the charge lever 33 is returned by a spring 35 until it contacts a stop 36.

Figure 2:
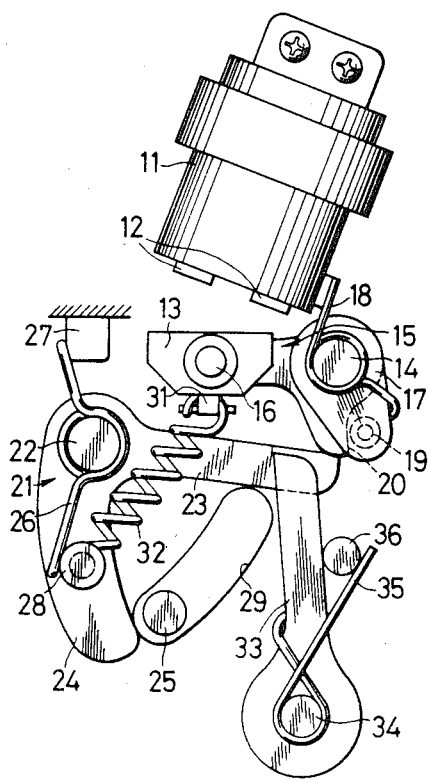

In the device thus constructed, under the condition that the electromagnet 11 attracts the armature 13 as shown in FIG. 1, the interlocking pin 19 abuts against the locking arm 23 to prevent the mirror driving lever 21 from being turned by the mirror lifting spring 26. In this case, since the force $P_2$ of the armature disengaging spring 32 is smaller than the force of attraction $P_3$ of the electromagnet 11, the armature 13, and accordingly the mirror driving lever 21, are held as shown in FIG. 1. When, under this condition, current is applied to the electromagnet 11 in response to the shutter release signal, the force of attraction of the electromagnet 11 is eliminated. As a result, the armature 13 is caused to part from the electromagnet 11 by the aforementioned tensile force $P_2$, and the armature lever 15 is turned counterclockwise by the force of the armature disengaging spring 32 (FIG. 2). Under this condition, the force of the armature disengaging spring 32 is still much larger than that of the energizing spring 18.

As the armature lever 15 is turned counterclockwise, the interlocking pin 19 is disengaged from the locking arm 23 of the mirror driving lever 21, that is, the lever 21 is no longer locked. Accordingly, the mirror driving lever 21 is turned clockwise, mainly by the force of the mirror lifting spring 26, while at the same time the mirror operating pin 25 is being moved upwardly by the operating arm 24 to lift the mirror. In the course of lifting the mirror, the armature disengaging spring 32 gradually contracts until the mirror reaches its uppermost position; that is, the length of the spring 32 decreases to its minimum length. In this case, the tensile force of the armature disengaging spring 32 becomes smaller than the force of the energizing spring 18 and the armature 13 is therefore brought into contact with the electromagnet 11 by the force of the spring 18. Accordingly, the core 12 of the electromagnet 11 and the attraction surface of the armature 13 are not exposed for a long period of time, and hence are protected from the accumulation of dust.

As in an ordinary camera, after the mirror has been lifted, a well-known mechanism releases the shutter for exposure and the mirror is restored. When exposure has been completed, the charge lever 33 is turned counterclockwise as described above until it abuts against the spring-hooking pin 28 so that the mirror driving lever 21 is set in the initial state (FIG. 4). Thereafter, the charge lever 33 is restored by the spring 35 to its initial position where it abuts against the stop 36. The above-described operations are carried out each time the shutter is released. When the mirror driving lever 21 is restored, the end portion of the locking arm 23 interferes with the interlocking pin 19. As a result, the locking lever 17, after being turned counterclockwise, is returned by the spring 18 to the position where the interlocking pin 19 abuts against the locking surface 20.

With the electromagnetic release device according to the invention, when the mirror approaches the uppermost position upon release of the shutter, the armature is again pushed against the pole face of the electromagnet. As a result, even if the winding operation is delayed after the shutter has been released or a long exposure time is employed, the attraction surfaces of the electromagnet and the armature are not exposed for a long period of time. Accordingly, there is little time for dust to accumulate on the attraction surfaces.

I claim:

1. In an electromagnetic release device for a single-lens reflex camera having an electromagnet adapted to release an armature therefrom, and an armature lever including said armature, said armature lever being turned to release a mirror driving lever from locking engagement upon release of said armature from said electromagnet, said mirror driving lever being turned when unlocked by rotation of said armature lever to lift the mirror of said camera, the improvement comprising:
   an energizing spring urging said armature lever towards said electromagnet; and
   an armature disengaging spring connected between said armature lever and said mirror driving lever urging said armature lever away from said electromagnet,
   said armature disengaging spring being positioned and having a spring constant such that a tensile force provided thereby for moving said armature lever away from said electromagnet when said mirror driving lever reaches an upper position thereof is smaller than the force of said energizing spring urging said armature lever towards said electromagnet.

2. The electromagnetic release device of claim 1, further comprising a locking lever, said locking lever being rotatably supported a first end thereof about a first shaft, said armature lever also being rotatably supported about said first shaft, said locking lever having a first pin fixed to a second end thereof, and said energizing spring having one end fixed and the other end engaging said locking lever to urge said first pin into engagement with said armature lever.

3. The electromagnetic release device of claim 2, said mirror driving lever being rotatably supported about a second shaft and having a first arm having a second pin fixed thereto, said armature disengaging spring being coupled between said armature and said first arm of said mirror driving lever, said mirror driving lever having a second arm abutting said first pin when said armature is engaged with said electromagnet prior to shutter release.

4. The electromagnetic release device of claim 3, further comprising a mirror lifting spring wound around said second shaft and having a first leg in abutment with a fixed point on said camera and another leg in abutment with said second pin.

5. The electromagnetic release device of claim 3, wherein a spring constant and initial length of said armature disengaging spring and the relative positions of said second pin and a point of attachment of said armature engaging spring with said armature are determined such that said tensile force provided thereby for moving said armature lever away from said electromagnet when said mirror driving lever reaches an upper position thereof is smaller than the force of said energizing spring urging said armature lever towards said electromagnet.

* * * * *